Figure 1:
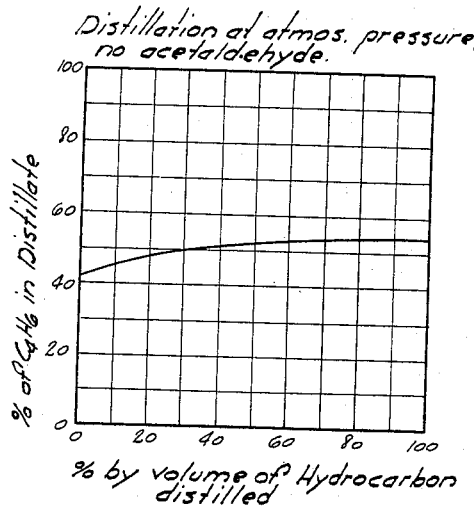

INVENTORS
Howard S. Nutting
Lee. H. Horsley
BY
Griswold & Burdick
ATTORNEYS

Patented Feb. 20, 1945

2,370,064

UNITED STATES PATENT OFFICE 2,370,064

SEPARATION OF BUTADIENE AND BUTYLENE FROM MIXTURES COMPRISING THE SAME

Howard S. Nutting and Lee H. Horsley, Midland, Mich., assignors to The Dow Chemical Company, Midland, Mich., a corporation of Michigan Application March 3, 1941, Serial No. 381,521

4 Claims. (Cl. 202—42)

This invention concerns an improved method of separating butadiene from hydrocarbon mixtures comprising the same and a more saturated aliphatic hydrocarbon having four carbon atoms in the molecule. It particularly concerns the separation of butadiene from butylenes to recover each in a form relatively free of the other.

Hydrocarbon mixtures comprising butadiene-1.3 and butylenes are obtainable at low cost by the dehydrogenation of butane or butylene and by the pyrolysis of other organic starting materials such as petroleum fractions, coal tar distillate, etc. Frequently the crude products comprise various other paraffinic, olefinic, diolefinic, and acetylenic hydrocarbons such as methane, ethane, propane, butane, pentane, and the corresponding unsaturated compounds, e. g. propylene, amylene, pentadiene, methyl acetylene, ethyl acetylene, vinyl acetylene, etc., but such complex mixture may be fractionally distilled to obtain a fraction consisting substantially of the hydrocarbons having four carbon atoms in the molecule. However, further separation of the hydrocarbons in such fraction by ordinary distillation is extremely difficult and impractical. The compounds, isobutylene, butylene-1 and butadiene-1.3, in particular have close to the same boiling point and distill together.

We have discovered that the butadiene and butylene ingredients of such mixture may readily be separated from one another by fractional distillation in the presence of acetaldehyde. The acetaldehyde apparently forms an azeotrope with the butylene which is of sufficiently low boiling point to permit its separation from the butadiene by fractional distillation. When the hydrocarbon mixture subjected to the distillation also contains butane and an acetylene having four carbon atoms in the molecule, the butane tends to distill in the first fraction together with acetaldehyde and part or all of the butylene, whereas the acetylenic hydrocarbon remains in the residue together with the butadiene. The residual mixture of butadiene and the acetylenic hydrocarbon may then be separated into its components by careful fractional distillation in the absence of acetaldehyde.

Other hydrocarbons such as ethane, propane, pentane, ethylene, propylene, or amylene, etc., may of course be present in the hydrocarbon mixture which is subjected to distillation together with acetaldehyde, but their presence usually reduces somewhat the efficiency of the distillation and frequently necessitates the employment of acetaldehyde in proportions considerably larger than would otherwise be required. Accordingly, such other hydrocarbons are preferably removed, e. g. by a preliminary ordinary distillation, prior to the distillation together with acetaldehyde.

The fractional distillation of the hydrocarbons together with acetaldehyde may be carried out in batchwise or in continuous manner at any pressure up to the critical pressure of the mixture. However, when operating at atmospheric pressure or lower, refrigeration may be required in order to condense the distillate. Also, the efficiency of fractionation increases as the distilling pressure is raised above atmospheric pressure. On the other hand, at extremely high pressures undesirable chemical reactions may occur. Accordingly, we usually carry the distillation out at pressures between 20 and 300, preferably between 40 and 200, pounds per square inch, gauge.

The proportion of acetaldehyde to be employed is dependent upon variable factors such as the kinds and proportions of hydrocarbons other than butylene and butadiene in the mixture, the pressure at which the distillation is to be carried out, etc., and cannot be stated exactly. However, when a mixture of butylene and butadiene is to be fractionally distilled together with acetaldehyde at atmospheric pressure and without return of the latter from the distillate, we usually employ about 0.25 part by weight of acetaldehyde per part of butylene. As the distilling pressure is increased, the proportion of acetaldehyde may be reduced. Also, by continuously or intermittently separating acetaldehyde from the hydrocarbon in the distillate and returning it to the distillation, the proportion required may, of course, be reduced greatly.

A particularly advantageous procedure is to employ the acetaldehyde in approximately the proportion required to distill together with the hydrocarbons which are more saturated than butadiene, so as to obtain a residue of the latter in a form relatively free of acetaldehyde and the more saturated hydrocarbons. If an acetylene having four or more carbon atoms in the molecule was present in the starting mixture, it is retained together with the residual butadiene. In such instance, the distillation may be continued in the absence of acetaldehyde to separate the butadiene from the acetylenic hydrocarbon and recover each in purified condition.

Similar results may be accomplished by carrying the fractional distillation out in continuous manner. For instance, a mixture of butane, butylene, butadiene, and vinyl acetylene and sufficient acetaldehyde to azeotrope with the butane and butylene may be fed into a distilling column. Upon heating and refluxing the mixture within the column, a mixture of acetaldehyde, butane, and butylene concentrates near the top of the column, butadiene concentrates in a zone part way up the column and vinyl acetylene concentrates toward the lower end of the column. The mixture of acetaldehyde, butane, and butylene may be withdrawn continuously as a top product, a portion preferably being returned near the top of the column, of course, for purpose of reflux; butadiene may be withdrawn as a side fraction from the column; and vinyl acetylene may be withdrawn from the lower end of the column as a bottom product. Acetaldehyde is advantageously separated from the hydrocarbons in the top product, e. g. by cooling and adding sufficient water to cause layer formation, and returned continuously or intermittently to the distillation. Once such continuous distillation is started, the introduction of fresh quantities of acetaldehyde to the distilling system may be discontinued, since, as just explained, the acetaldehyde is recycled in the distilling system and thus re-employed for the separation of further quantities of the hydrocarbons. By operating as just described, the hydrocarbon mixture employed as the starting material may be fed continuously to a distilling system and butylene, butadiene and vinyl acetylene, each in a form relatively free of other unsaturated hydrocarbons be produced therefrom.

Figure 2:
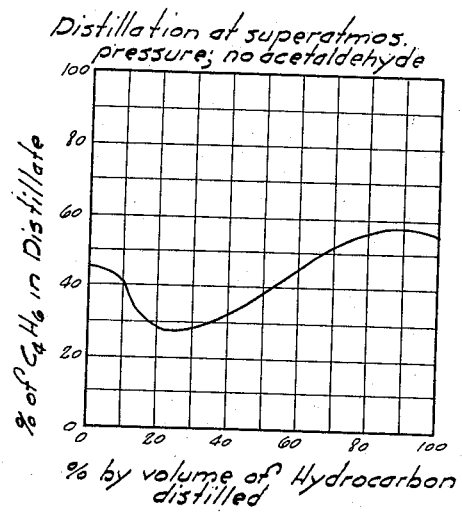
Figure 3:
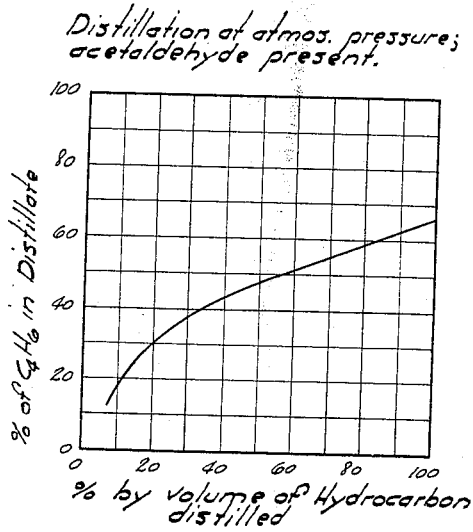
Figure 4:
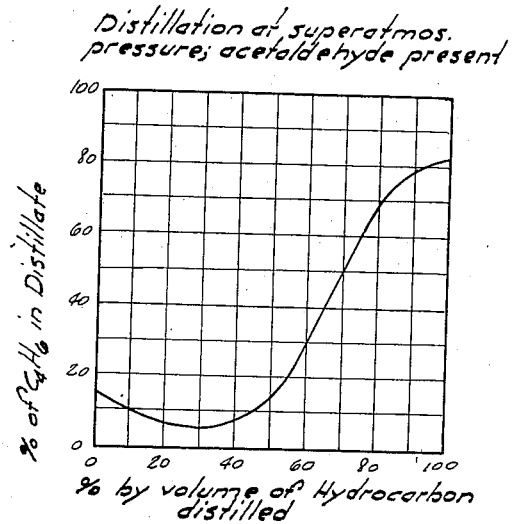

The accompanying drawing is a series of graphs showing the results obtained when equimolecular mixtures of butylene and butadiene are fractionally distilled under certain conditions. In each graph, the vertical ordinate represents the per cent by weight of butadiene, based on the combined weight of butylene and butadiene, in fractions of the distillate and the horizontal axis defines each fraction of distillate as that which is distilling when the stated per cent by volume of the original hydrocarbon mixture has been distilled. Fig. 1 of the drawing gives the results obtained by fractionally distilling the hydrocarbon mixture at atmospheric pressure, and Fig. 2 gives the results obtained by distilling a similar mixture at pressures which varied from 210 to 120 pounds per square inch, gauge, as the distillation progressed. Fig. 3 gives the results obtained by fractionally distilling the hydrocarbon mixture, together with sufficient acetaldehyde to azeotrope with the hydrocarbons, at atmospheric pressure. Fig. 4 gives the results obtained by distilling the hydrocarbon mixture, together with sufficient acetaldehyde to azeotrope with the hydrocarbons, at pressures which varied from 135 to 50 pounds per square inch, gauge, as the distillation progressed. The data of Figs. 1 and 3 was determined using an eleven plate distilling column and the data of Figs. 2 and 4 was determined using an eight plate column.

By comparison of Fig. 1 of the drawing with Fig. 3 and of Fig. 2 with Fig. 4, it will be seen that the fractional distillation to separate butylene from butadiene occurs more efficiently when carried out in the presence of acetaldehyde than when carried out at the same pressure and in similar apparatus in the absence of acetaldehyde. The drawing also shows that more efficient fractionation is obtainable by distilling the hydrocarbons together with acetaldehyde at atmospheric pressure than is obtainable by distilling the hydrocarbons in the absence of acetaldehyde at either atmospheric or increased pressures. Figs. 3 and 4 show that the efficiency of fractionation, when distilling the hydrocarbons together with acetaldehyde, increases as the pressure is raised, and that by carrying such distillation out at superatmospheric pressure, excellent separation of the butylene from the butadiene may be obtained.

It will be understood that the drawing presents comparative results only, and that it does not represent the maximum degree of fractionation obtainable in practice of the invention. By employing a highly efficient distilling column such as is used in commercial distillations, e. g. a column having from 20 to 100 plates, or by redistilling together with acetaldehyde the fractions obtained in a primary distillation, such as that illustrated in Fig. 4, a mixture of butylene and butadiene may be separated to recover each component in substantially pure form.

The following examples illustrate certain ways in which the principle of the invention has been employed, but are not to be construed as limiting the invention.

EXAMPLE 1

70 parts by weight of a liquefied cracked-oil gas fraction containing approximately 47.8 per cent by weight of butadiene-1.3, 47.8 per cent of a mixture of butylene-1 and butylene-2, and 4.4 per cent of methyl acetylene was treated with 30 parts of acetaldehyde. The mixture was subjected to fractional distillation, with continuous return of part of the distillate as reflux material, until 38 per cent by weight of the mixture had been distilled. The distillate contained approximately 20 per cent by weight of acetaldehyde, 47 per cent of butylene, 25.0 per cent of butadiene, and 8 per cent of methylacetylene. The residue from the distillation contained approximately 36 per cent of acetaldehyde, 25 per cent of butylene and 39 per cent of butadiene. Based on the combined weight of the butylene and butadiene only, the distillate contained 65.3 per cent of butylene and 34.7 per cent of butadiene and the residue contained 39.4 per cent of butylene and 60.6 per cent of butadiene.

EXAMPLE 2

A mixture of 750 parts by weight of acetaldehyde and 450 parts of a hydrocarbon mixture containing approximately 50 per cent by weight of butadiene-1.3 and 50 per cent of butylene was fractionally distilled at superatmospheric pressure and each fraction was treated to remove the aldehyde and then analyzed. The distillation was continued until the major portion of the hydrocarbons had been distilled and the residue consisted very largely of acetaldehyde. The following table gives the volume of each fraction of liquefied distillate in cubic centimeters; the pressure on the distilling system during collection of the fraction in pounds per square inch, gauge; and the per cent by weight of butylene and of butadiene in each fraction, based on the combined weight of said hydrocarbons.

Table

| Fraction No. | Volume, c. c. | Distilling pressure, lbs./sq. in. | Composition | |
|---|---|---|---|---|
| | | | Per cent $C_4H_8$ | Per cent $C_4H_6$ |
| 1 | 90 | 135 | 91 | 9 |
| 2 | 100 | 115 | 93 | 7 |
| 3 | 100 | 100 | 89 | 11 |
| 4 | 100 | 75 | 65 | 35 |
| 5 | 100 | 60 | 55 | 45 |
| 6 | 25 | 50 | 30 | 70 |

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:

1. In a method of separating butadiene from a mixture thereof with a more saturated hydrocarbon having four carbon atoms in the molecule, the steps which consist in forming a mixture of acetaldehyde with the hydrocarbons to be separated from one another and fractionally distilling a mixture of acetaldehyde and the more saturated hydrocarbon from the butadiene to recover the latter in a form relatively free of the more saturated hydrocarbon, sufficient acetaldehyde being present during the distillation to permit the latter to be carried out with control of the distilling temperature.

2. The method which comprises adding acetaldehyde to a hydrocarbon mixture containing butadiene and a butylene and fractionally distilling the mixture at a pressure greater than 20 pounds per square inch to distill a mixture comprising acetaldehyde and butylene away from the butadiene, sufficient acetaldehyde being present during the distillation to permit the latter to be carried out with control of the distilling temperature, whereby the butylene and butadiene are separated from one another.

3. The method which comprises adding acetaldehyde to a mixture of a butylene and butadiene and fractionally distilling the resultant mixture at a pressure between about 40 pounds and about 200 pounds per square inch to distill a mixture of acetaldehyde and the butylene away from the butadiene and obtain the latter in a form substantially free of butylene.

4. In a continuous method for the separation of butylene and butadiene from a hydrocarbon mixture comprising the same, the steps which consist in fractionally distilling the hydrocarbon mixture in the presence of acetaldehyde to distill off a mixture comprising acetaldehyde and butylene, continuously returning a portion of the distillate for purpose of reflux, separating acetaldehyde from the hydrocarbon in the remainder of the distillate and returning the acetaldehyde to the distillation, withdrawing butadiene from a lower portion of the distilling column and, during said operations, feeding additional quantities of the hydrocarbon mixture to the distilling system.

HOWARD S. NUTTING.
LEE H. HORSLEY.